United States Patent

Johnson

[11] Patent Number: 5,838,016
[45] Date of Patent: Nov. 17, 1998

[54] INFRARED RADIATION FILAMENT AND METHOD OF MANUFACTURE

[76] Inventor: Edward A. Johnson, 41 North Rd., Ste 103, Bedford, Mass. 01730

[21] Appl. No.: 905,599

[22] Filed: Aug. 4, 1997

Related U.S. Application Data

[63] Continuation of Ser. No. 511,070, Aug. 3, 1995, abandoned.
[51] Int. Cl.⁶ .................................................. H05B 3/26
[52] U.S. Cl. ........................... 250/504 R; 250/493.1; 250/495.1
[58] Field of Search ................... 250/504 R, 495.1, 250/493.1

[56] References Cited

U.S. PATENT DOCUMENTS

| | | | |
|---|---|---|---|
| 3,875,413 | 4/1975 | Bridgham | 250/492 |
| 4,620,104 | 10/1986 | Nordal | 250/493.1 |
| 4,644,141 | 2/1987 | Hagan | 219/543 |
| 4,859,858 | 8/1989 | Knodle | 250/504 R |
| 4,922,116 | 5/1990 | Grinberg | 250/495.1 |
| 5,074,490 | 12/1991 | Muse et al. | 244/3.11 |
| 5,128,514 | 7/1992 | Lehmann et al. | 219/209 |
| 5,152,870 | 10/1992 | Levinson | 156/659.1 |
| 5,220,173 | 6/1993 | Kanstad | 250/493.1 |
| 5,324,951 | 6/1994 | Kocache et al. | 250/493.1 |
| 5,602,398 | 2/1997 | Knodle et al. | 250/504 R |

*Primary Examiner*—Kiet T. Nguyen
*Attorney, Agent, or Firm*—Lappin & Kusmer LLP

[57] ABSTRACT

An improved IR radiation source is provided by the invention. A radiation filament has a textured surface produced by seeded ion bombardment of a metal foil which is cut to a serpentine shape and mounted in a windowed housing. Specific ion bombardment texturing techniques tune the surface to maximize emissions in the desired wavelength range and to limit emissions outside that narrow range, particularly at longer wavelengths. A combination of filament surface texture, thickness, material, shape and power circuit feedback control produce wavelength controlled and efficient radiation at much lower power requirements than devices of the prior art.

25 Claims, 3 Drawing Sheets

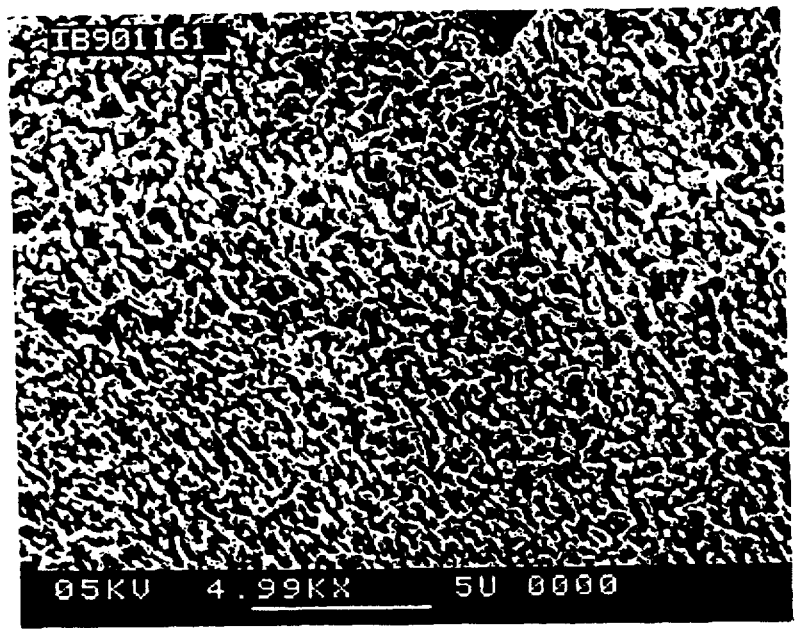
FIG. 4A1
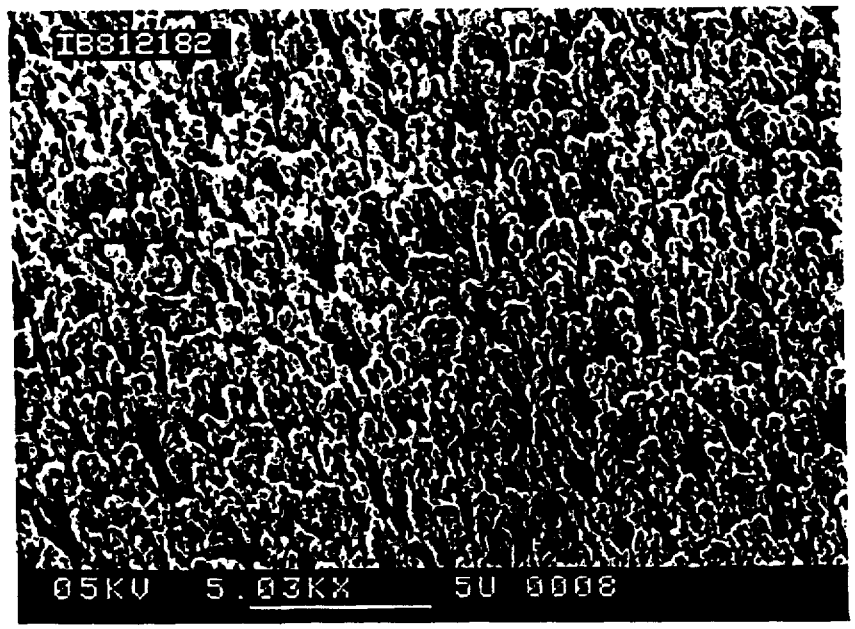
FIG. 4A2

INFRARED RADIATION FILAMENT AND METHOD OF MANUFACTURE

This application is continuation of the application Ser. No. 08/511,070, filed on Aug. 03, 1995, now abandoned.

FIELD OF THE INVENTION

The field of the invention is electro-optical radiation sources and a method of production of a specifically tuned radiation source. The focus of the invention is a novel filament contained within a packaged radiation source device, configured to be a component in an instrumentation application. The specific application and embodiment described is an infrared radiation source for use in various calibration, reference and measurement instruments; but the filament component and the method of wavelength tuning that component in the manufacturing process may be applied widely to a variety of other radiation emission requirements.

BACKGROUND OF THE INVENTION

The tradeoffs and requirements of radiation sources for electromagnetic and optical radiation sources, and in particular the use of enclosed electrically-excited filaments, have been the subject of development for over 100 years. As this development addressed more narrow and specific radiation requirements of controlled wavelength emission for accuracy and precision, power efficiency requirements for economy, and loss reduction and temperature control, the problems involved in design and manufacture of suitable radiation sources have become correspondingly more complex.

A particular application environment that has received a great deal of inquiry is the area of infrared radiation, which is efficiently useful and necessary in a variety of measurement and detection instrumentation. Many such applications are limited in power, space and cooling ability and require efficient illumination within a limited spectral band. Some considerations of this environment and difficulties of emitter design are discussed in U.S. Pat. No. 3,875,413 to Bridgham for Infrared Radiation Source, which particularly recognizes the difficulty of achieving stability and control of temperature and emission wavelength in a thin, flat, electrically heated radiator.

Temperature stability has been a particular development objective of traditional IR sources for calibration and measurement applications, which rely on steady state heating of an object with relatively large thermal mass. This in turn requires a long turn-on and settling time for stable operation and produces a large amount of waste heat.

As will be seen in the following descriptions, the invention may be compared favorably as an improvement over many previous radiation sources and could usefully replace such traditional reference emission sources as wire filament bulbs, LEDs, lead salt lasers, and rare earth oxide line emitters in measurement applications. Although these narrow band emitters produce isolated line radiation, they can only be tuned with difficulty and over narrow ranges. Incandescent sources typically produce a radiation spectrum described by the Planck curve with very little of the total radiation in the desired band for a particular measurement. Specifically, again in the infrared field, sources of the prior art include developments such as pulsed radiation sources using a thin plate form of radiation filament.

The prior art generally teaches the necessity of a thin plate element for radiation cooling, the '413 patent referenced above, for instance, specifying 1–2 $\mu$m. U.S. Pat. No. 5,220,173 to Kanstad for Pulsating Infrared Radiation Source proposes a formula for required thinness. The '173 patent proposes that thin flat plate elements will efficiently radiate in the IR range as the low mass of the thin material will radiate greater heat than stored thermal energy delivered by a pulsed driving circuit, and predicts the thinness of material necessary to produce this effect at the 1–2 micron range. As the focus of the prior art is on radiation source thinness for cooling effect, problems of emissivity, wavelength control and resistance control have been unaddressed.

SUMMARY OF THE INVENTION

The inquiry leading to the invention sought to examine the prior art and to practically implement an improved IR source. A new approach to fabrication of the filament emitter was required, as manufacture of the emitter described in the prior art proved problematic in that the flat plate configuration of the emitter could not be made to reliably radiate the desired radiation wavelength range, or to produce radiation outside the desired wavelength spectrum with efficient power consumption. An improved method of temperature and wavelength control was sought, and a different direction from merely specifying the thickness of material used for the emitter was taken, involving texturing the surface of the filament material to produce a microscale topography on the radiating surface that will enhance radiation while providing precise control of source temperature and emission wavelengths. As surface texture primarily produces the efficacious improvements in emissivity, radiative surface area, and wavelength control, the invention does not depend, as does the prior art, on the native properties of the source element material to achieve the desired optical effects, nor are coatings necessary which undesirably increase mass of the radiator.

The design of the radiation filament of the invention seeks to improve or remedy deficiencies noted in the prior art to the effect that conventional low thermal mass incandescent sources, including metal ribbons, thin flat plates and wire coils, which might otherwise be desirable for use as a filament, suffer from low emissivity and low electrical resistance which causes difficulty in assuring that the drive power warms the radiator and not the leads and contacts. By simultaneously improving the emissivity, thinning the source, and increasing electrical resistance, the present invention overcomes both problems.

A principal objective of the invention in its development was to provide a practical method of design and manufacture of an incandescent radiation element spectrally tuned to produce high emissivity within a narrow spectral band. More specifically, an infrared radiation source was sought such that the source emits with the efficiency close to that of an ideal black body in the desired emission band, but which has low emissivity outside that band. This was achieved by controlling the source's surface topography on a micron scale.

Another important objective is to utilize existing but untested technologies for fabricating a radiation filament designed for specific wavelength emissions. Another objective is to provide a radiating emission source that would be stable, essentially self-correcting, and mechanically simple. A specific application objective is to develop a high brightness precision controlled infrared spectrum source emitter that can be packaged with no moving parts and used in rugged environments.

These and other objectives were achieved and put into practice by development of techniques for modifying the surface characteristics of the radiation filament. By producing a random distribution of features of controlled size, surfaces were produced with high emissivity for short wavelengths and low emissivity for long wavelengths. By making the feature sizes very uniform, surface emissivity spectra were exhibited in sample materials with a sharp long wavelength cut-off, and refinements in feature size produced adjustments to the exact wavelength of the cut-off point.

A surface that can be produced with microscopic feature topology tailored to produce specific emitted frequencies when electrically stimulated proved practical as various texturing methods—mechanical, chemical, electro-chemical and particle bombardment—were examined. For any choice of material, differing feature patterns were produced under a variety of texturing methods and variables involved in application of those methods, as will be particularly described later in discussion of the preferred embodiment. Texturing by any of these means produces a pattern of relatively long "fingers" or peaks and valleys that not only increase the radiating surface area remarkably, but also produce interferences and reinforcements in the interstices that provide high emissivity at wavelengths comparable to the size of the surface features.

The emissions produced by the textured material surface when stimulated will cutoff at the long wavelength end of the desired measurement band. Thus a reproducible sample of material textured with adjusted process variables is achieved and is defined by the optimum texturing process that will produce the target radiation spectrum. While the first embodiment was designed for the IR application range, similarly predicted texturing processes for a specific surface feature density would produce the same controlled emissivity for any target wavelength in a calculated relationship between surface feature density and desired radiation wavelength. Various surface modification techniques are known to produce a range of feature densities related to variables of the material surfacing methodologies and may be usefully employed to produce the calculated wavelength emissions in the materials which are discussed herein.

As the discussion of the preferred embodiment illustrates, a practical methodology for practice of the invention is to use a directed energy process in the form of an ion beam mill to texture the surface of a blank wafer of material to the surface topology that will precisely radiate the design wavelengths and very little of other wavelengths. This technique also usefully reduces the thermal mass of the material as it is textured. However, many other texturing means could be usefully employed, or alternative texturing means used that may produce surface effects not achievable in others. Such alternatives include chemical baths, electro-chemical immersion, and various enhancements to energy beam bombardment methods, as well as mechanical abrasion.

While the discussion below discusses primarily ion beam bombardment, no limitation to this fabrication method is implied, as any means of texturing will produce modified emission characteristics in a suitable material sample. Similarly, although the investigation that produced the preferred embodiment for IR applications identified titanium foil as an appropriate filament material, many other metal foils, thin nonmetallic and semiconductor materials, and glasses may be textured using these methods to modify and control their emissive properties. Metal foils are found to be particularly adaptable to the techniques of ion beam texturing, as the foils may be formed as self-supporting filaments in a thinness order of a few microns in order that the temperature of the filament material changes very rapidly in response to changes in input power. This responsive temperature rate usefully allows real-time feedback and control of the source temperature, which is particularly useful in applications that require a real-time reference for infrared intensity.

Thus it is possible using the techniques described herein to produce a dramatically improved infrared radiation device, including precise spectral tailoring and short warm-up time, that essentially eliminates parasitic heat which warms the optical train, instrument enclosure and detector and that causes thermal drift and resulting loss of precision. Because the textured metal foil material is so thin and because it is formed into a folded-path serpentine shape, the filament so formed exhibits high resistance compared to incidental resistance in the mounting and drive circuit, assuring that the drive power warms the radiation source and not the leads and contacts. The serpentine shape is especially useful to increase the electrical resistance and the surface area available to radiate in a resistive ribbon format without introducing local temperature non-uniformity ("hot spots") or sharp corners that may promote stress fractures.

The invention takes a novel approach to emitter element design that provides previously unachieved levels of wavelength tailoring to achieve major efficiencies in output radiation, power consumption and waste limitation. While the improvement of application in the infrared instrumentation environment is the inquiry that yields this invention, the configuration design and fabrication methodology described may be applied in many other applications requiring very efficient and controlled electromagnetic and optical emissions.

One goal of the invention is to provide a compact miniature IR reference source to minimize parasitic heating of associated optics in a system with stringent size, weight and waste-heat rejection constraints. The invention achieves this objective by enabling an IR source which includes real time feedback and control to maintain temperature stability. Temperature control requires that the source temperature follow changes in input power with adequate speed. In practice, this means that the source must be in radiative equilibrium with the input drive power equal to the power radiated out. While it is at temperature, the source must change temperature by an amount significant to the measurement on a time scale which is loosely bounded by electrical sampling time for the drive pulse on the fast end, and sharply bounded by the characteristic response time for the infared detector on the slow end, which control criterion may be expressed as a temperature slew rate. For one application, the source was required to maintain 0.5K stability for an IR system with 1 m-sec sampling time, using a control circuit capable of 50 $\mu$sec sampling time. This required achieving slew rates of approximately 500 to 10,000 deg K/sec.

Since the device is operating in radiative equilibrium, the device will radiate out heat at a rate proportional to its emissivity and surface area. Temperature change, then, is governed by the amount of heat stored in the device per degree per unit area available to radiate. The total stored heat per degree is given by AtCp (where A is the unit area, t is the thickness, C is the specific heat, and p is the mass density); the heat stored per degree per unit area thus being tCp. Accordingly, $$\text{Slew rate} = \frac{\text{Heat out per unit time}}{\text{Heat stored per degree}} = \frac{\epsilon \sigma T^4}{tC\rho}$$

For the textured titanium sources described as the preferred embodiment of the invention, the final source thickness achieved is on the order of 2–10 $\mu$m. For a source operating at 950K, a temperature slew rate may be computed: using a specific heat of 0.523 $Jg^{-1}K^{-1}$, an emissivity of 1 and a material density of 4.5 $g/cm^3$, this predicts a temperature slew rate in the range from $2 \times 10^3 K\ sec^{-1}$ to $10^4 K\ sec^{-1}$, well within the desired range.

BRIEF DESCRIPTION OF THE DRAWINGS

FIGS. 4A1 and 4A2 show two electron micrograph samples with surface features of metal foil after texturing;

DETAILED DESCRIPTION OF THE INVENTION

Figure 1:
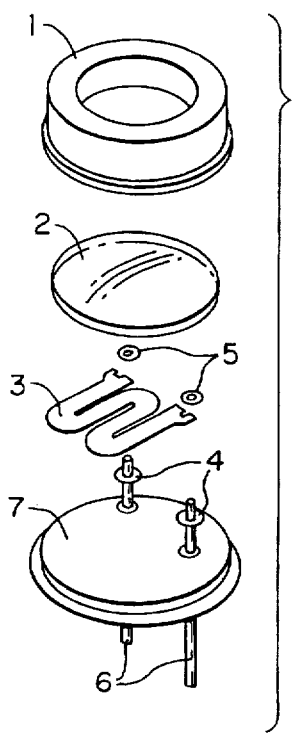
FIG. 1 is an exploded view of the radiation emitter showing placement of the textured filament.

Referring now to the drawings, FIG. 1 illustrates in exploded view the compact configuration of the radiation emitter component as it may be adapted for ready use by mounting in an instrument or on a circuit board. A cylindrical can-like cover (1) contains a closely fitted window (2) of a material suitably transparent or transmissive to the desired radiation spectrum of the instrument. As an instrument designed to operate in infrared frequencies is discussed here, the window material was formed of a sapphire which is not only transparent to IR radiation but is suitably durable in demanding environments in which the instrument may be installed. The radiation filament (3) is supported at filament fittings (3a), (3b) and within the can on two upset pins (4), each pin further extended to form electrical leads (6) inserted through can floor (7). The filament (3) is securely suspended in the can resting on elevating shoulders (4a), (4b) on the pins (4) and secured by washers (5) such as iconel clamping washers which further enable laser welding. The can configuration may be conveniently sealed by a weld at the junction of can top (1) and floor (7) and by a seal around the window (2). The can may also filled with an inert gas, if desired, to retard corrosion of the filament (3).

Figure 2:
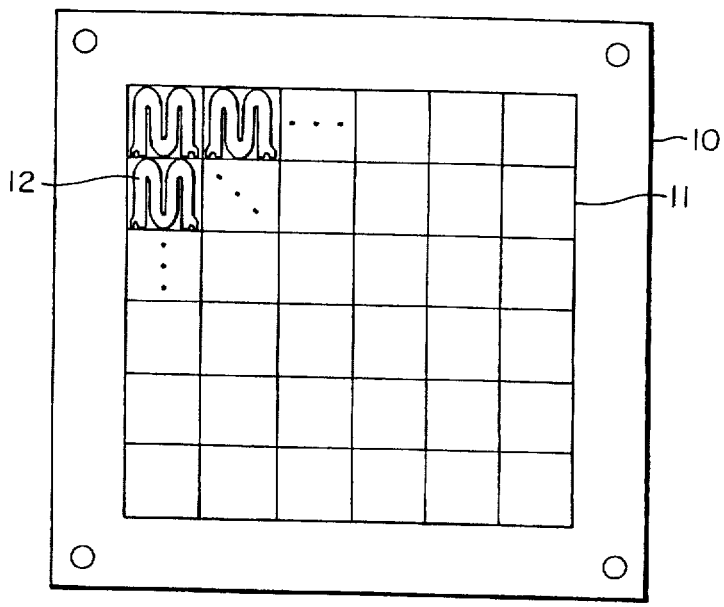
FIG. 2 is a plan view of a thin material blank showing an imposed cutting pattern for serpentine shaped filament production.

FIG. 2 shows that the filament (12) may be fabricated from a sheet or blank (10) of suitable material, such as a thin metal foil. In IR applications, titanium foil is suited to tuning for the applicable frequency range. The blank (10) is on the order of two inches square and numerous filament shapes may be laid out on a grid pattern (11), each filament (12) laid out as a flat shape that can assume a wide variety of designs for specific objectives, such as: to provide a folded ribbon length to increase resistive path and rounded closely spaced curves to provide rigidity and uniform electrical heating with no hot spots; and to provide construction details like the measured support peg fittings (3a), (3b) at the ends of the filament (3) shown in FIG. 1. The serpentine or multiple folded curve shape of the filament as shown is designed to meet all these criteria for this application. After texturing the entire blank (10) as discussed below, for example by ion beam bombardment, the individual filaments are cut from the blank (10) by stamping or by such precision cutting as a computer-controlled wire EDM method.

Figure 3:
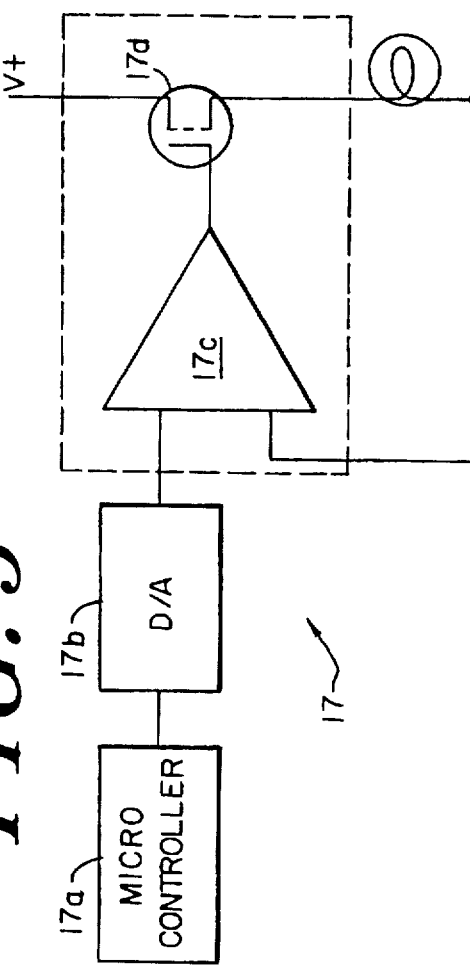
FIG. 3 is a circuit diagram for delivering power to the radiation filament device, illustrating a feedback loop for precise temperature control and stability.

As many other prior art devices have illustrated, a pulsed current is desirable to limit the emission to the minimum necessary time, to dissipate heat in the off cycle, and to coincide with instrument function timing; and the high temperature slew rate (necessary for control) allows this pulsed operation. Further, a power circuit may also include a feedback loop to ensure temperature stability by adjusting drive power, for instance, to accommodate changes in emitter temperature which may cause temperature and wavelength drift. A typical feedback control power circuit (17) is illustrated in FIG. 3; and circuit (17) embodies a control strategy to take advantage of the high temperature slew rate available with the radiation source of this invention by monitoring the electrical drive signal, either by measuring current through the radiation element or the voltage drop across the element, or both. In circuit (17), a commercially available PIC microcontroller (17a) commands a 12-bit D/A converter (17b) to output a voltage signal proportional to the desired current through the source and a precision, low-noise operational amplifier (17c) continuously adjusts the gate voltage of a power MOSFET (17d) to achieve this current through the device. Depending on the desired temperature, current through the device is on the order of several hundred mA (200 mA at 500K, for example) while it is on. At 500K, the rate of temperature change with current is approximately 0.8 mA/K, so that the 12-bit dynamic range of the A/D converter (17b) is more than adequate to achieve the specified stability.

Power requirements of the filament configuration according to the invention are lower because the suppression of wavelength radiation outside the target spectrum provides significant improvement in conversion efficiency compared to nontextured filaments. The textured material of the filament enables the active feedback control of source temperature provided by the illustrated circuit (17), as thermal mass is small enough that the source reaches radiative equilibrium quickly (on a time scale of 100 μsec/deg K.) so that available A/D chip circuit elements can readily follow it.

As texturing of the filament is identified as a critical focus of the invention, that texturing is illustrated in physical dimensions by the scanning electron micrographs of FIGS. 4A1, 4A2, taken from samples of alloy foils that had been bombarded in an ion beam mill for this purpose. It may be clearly seen in the two SEM depictions of FIGS. 4A1, 4A2 that surface feature size and character not only vary dramatically from sample to sample, but are remarkably uniform within each sample. As variables of the mill are adjusted, differing feature dimensions and spacing are achieved, such as the visible differences between the top displayed sample of FIG. 4A1 and the bottom sample of FIG. 4A2. Both samples were milled to about five microns thickness with the resulting vertical "fingers" extending upward from the lower surface for much of that height; valleys and spaces are visible and form larger interstices in the top sample and a tighter pattern on the bottom sample. It can clearly be envisioned from the texturing patterns that the emitting surface area of a filament so formed is much greater than a smooth material blank by several multiples, and that over the entire surface the emission spectrum would be regularized by patterns of interference and reinforcement.

Figure 4B:
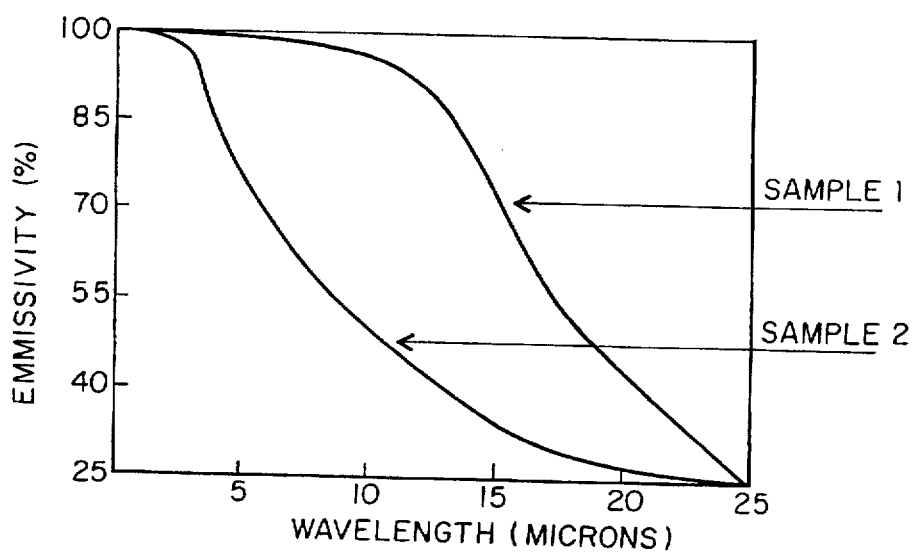
FIG. 4B is a plot of emission frequencies associated with each of two example textured surfaces.

Two such samples (but not necessarily the same samples as depicted in the SEM photographs of FIGS. 4A1, 4A2) were tested to determine the frequency emission characteristics, shown on the plot of FIG. 4B. The emitted wavelength exhibited by each sample against emissivity shows a primary range of about 5–15 microns for one and 10–20 microns for the other. Each of these samples can produce the same controlled response as they are textured of the same materials and variable milling conditions. Close examination of the SEM photographs of FIGS. 4A1, 4A2 yields a measure of feature density which correlates with radiative frequencies such that the cut-off wavelength occurs at approximately 2π times the median feature density. Of course, fine adjustments in the ion bombardment or other texturing processes will result in fine adjustments to the resulting feature density, thereby fine tuning the radiative wavelength range.

Figure 5:
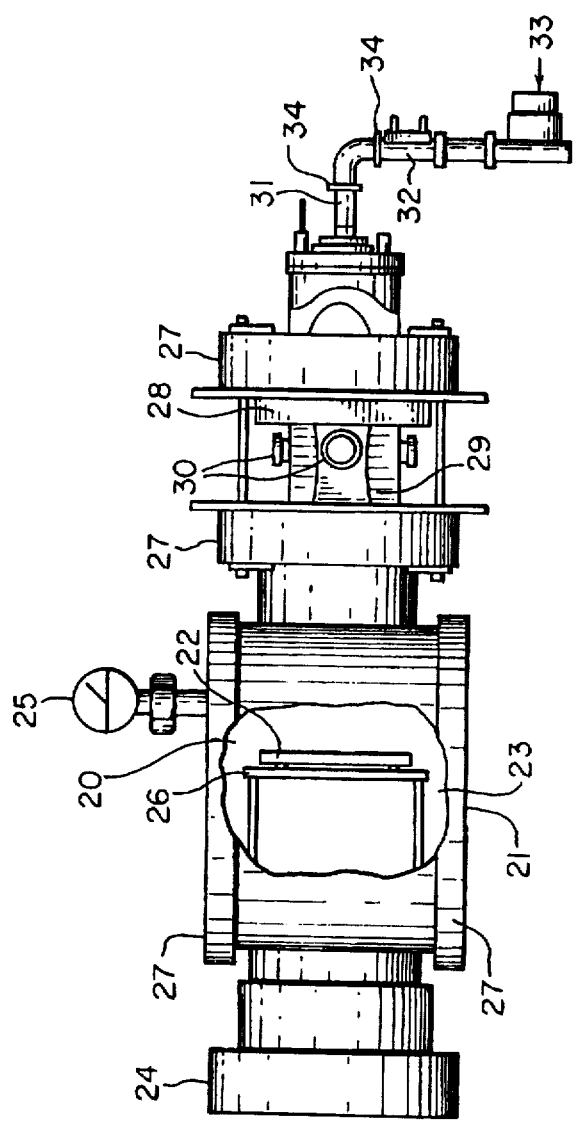
FIG. 5 is a representational view of an ion beam bombardment source and processing chamber.

The preferred ion beam texturing process is illustrated by the schematic of FIG. 5 showing a plasma source used as an ion beam mill (20) in representational form. The sample (22), for instance the blank (10) of FIG. 2, is supported by sample holder (23). A vacuum is disposed in the process chamber (29) with a suitable pump (24), and an ion gauge (25). The ion beam—which originates in a plasma formed by magnetron (33) via coupler (32), wave guide (31), and permanent magnet (28)—typically passes through an extraction grid (26) on the way to the object point at which sample texturing occurs by incidence of the beam at a controlled angle and strength. Another variable effect is produced by the ion beam mill configuration as an alternating current field that will also control ion extraction as it surrounds the blank and seed source. Yet another effect may be obtained by introduction of DC bias, which may be applied as a control mechanism of ion extraction which in turn affects texturing. Inert gas plasmas such as argon may be used as an immersion medium within the mill.

A number of variables and supplemental techniques can vary the texturing effect produced by the ion beam mill. For instance impurities may be introduced to the sample by inclusion of a seed mesh, and in the application of the preferred embodiment it was found that inserting a tantalum mesh produced desirable texturing effects in the ion beam milling process and that the effects could be varied for tuning by applying variable bias voltages to the mesh. Beam current, and seeding rate variables also affect surface finish. Control of surface temperature of the blank or regulating vacuum chamber oxygen partial pressure during bombardment affects resulting feature size. Further, other ion sources have been used in the milling process such as a Kaufmann type ion beam sputtering system which may produce similarly useful texturing effects.

While the functioning of the ion milling process are well known for a variety of purposes including metals texturing, the application of this powerful energy directed process to fabricating precisely tuned radiation emitters is unexpectedly efficacious and resolves the problems of the prior art outlined above. Similarly, the texturing could be accomplished in the same iterative sample tuning process by other methods such as chemical etching, electro-chemical immersion, or other forms of energy beam milling.

The process of texturing the blank by any method, but in particular by ion beam bombardment, will not only texture the sample but desirably reduce the mass and thickness significantly in the process by 50% or more from its initial untextured mass. For instance the titanium foil of the preferred embodiment was reduced from 12 microns to 6 microns as it was tuned to the target emission spectrum. Note however that the end thickness is not the determining factor of achieving the emission wavelength tuning, since reducing mass is not critical and since tuning is primarily a function of the surface texture.

What is claimed is:

1. A radiation source, comprising:
   a filament for producing infrared emissions tailored to a selected infrared wavelength spectrum when electrically stimulated, said filament having a textured surface with features therein that are appoximately sized to said selected infrared wavelength spectrum, and means for mounting the filament to electrical terminals.

2. The radiation source of claim 1 wherein said features are regularly distributed about said surface and extend outwardly from said surface.

3. The radiation source of claim 1 wherein said filament is shaped to increase electrical resistance while maintaining sufficient rigidity and geometry to be supported within a housing.

4. The radiation source of claim 3 wherein said filament is cut to a multiply folded curved shape.

5. The radiation source of claim 1 wherein said wavelength spectrum of said filament is tuned to an infrared radiation range.

6. The radiation source of claim 1 wherein said filament comprises titanium foil.

7. The radiation source of claim 1 further comprising:
   an electric power circuit connected to said filament to provide metered current to excite said filament, and a feedback control circuit operatively connected to said power circuit to monitor resistance of said filament and to adjust current to said filament, thereby controlling temperature of said filament.

8. The radiation source according to claim 1, further comprising a housing to contain and support the filament.

9. The radiation source of claim 1, wherein the features are sized to between about two and ten microns.

10. The radiation source of claim 1, wherein the features are substantially uniform in size such that the emissions have a cut-off wavelength greater than the size.

11. The radiation source of claim 10, wherein the cut-off wavelength is approximately 2π times the size.

12. The radiation source of claim 1, wherein the features comprise peaks and valleys which increases radiative surface area.

13. The radiation source of claim 1, wherein the features are formed by ion beam bombardment.

14. The radiation source of claim 1, wherein the filament comprises metal foil.

15. The radiation source of claim 14, wherein the metal foil comprises titanium.

16. The radiation source according to claim 1, wherein the filament has a thickness of approximately five microns.

17. The radiation source according to claim 1, further comprising a package for enclosing the filament, the package having a window substantially transparent to the spectrum and two terminals extending through the package, the filament being mounted on the terminals within the package wherein the emissions transmit through the window.

18. The radiation source according to claim 1, wherein the features are randomly distributed about the surface.

19. A radiation source comprising:
   a filament and two terminals for supporting said filament, the filament having a surface textured in a pattern tuned to a selected infrared emissivity spectrum and being shaped to include at least one curve between said two terminals, electrical leads connected to said terminals, and p1 a package comprising a floor and a covering can, said terminals being rigidly fixed to said package and said leads extending through the floor of said package.

20. The radiation source of claim 19, further comprising a window made from, sapphire.

21. The radiation source of claim 19, further comprising two washers of inert material for retaining said filament on said terminals, each of said washers being a weld medium to retain said filament on one of said terminals.

22. The radiation source according to claim 19, further comprising a window of material substantially transparent to the spectrum.

23. The radiation source according to claim 19, further comprising an inert gas for filling the package.

24. The radiation source according to claim 19, wherein the can is welded to the floor.

25. The radiation source according to claim 19, wherein the features are randomly distributed about the surface.

* * * * *

UNITED STATES PATENT AND TRADEMARK OFFICE
CERTIFICATE OF CORRECTION

PATENT NO. : 5,838,016
DATED : November 17, 1998
INVENTOR(S) : Edward A. Johnson It is certified that error appears in the above-identified patent and that said Letters Patent are hereby corrected as shown below:

Please add the following statement:
Col. 1 line 5

--This invention was made with Government support under grant DE-FG03-94ER81738 awarded by the Department of Energy. The Goverment has certain rights in this invention.--

Signed and Sealed this

Twenty-second Day of May, 2001

*Attest:*

NICHOLAS P. GODICI

*Attesting Officer*    Acting Director of the United States Patent and Trademark Office